(12) United States Patent
Shin et al.

(10) Patent No.: US 6,197,209 B1
(45) Date of Patent: Mar. 6, 2001

(54) METHOD OF FABRICATING A SUBSTRATE

(75) Inventors: Woo Sup Shin, Anyang-si; Jae Gyu Jeong, Taegu, both of (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/002,037

(22) Filed: Dec. 31, 1997

Related U.S. Application Data

(63) Continuation-in-part of application No. 08/549,442, filed on Oct. 27, 1995, now Pat. No. 5,766,493.

(51) Int. Cl.$^7$ .................. G02F 1/13; C03C 15/00
(52) U.S. Cl. .................. 216/84; 216/103; 374/3; 374/5; 374/7
(58) Field of Search .................. 216/84, 103; 374/3, 374/7, 5; 205/641

(56) References Cited

U.S. PATENT DOCUMENTS

| | | | |
|---|---|---|---|
| 3,689,333 | 9/1972 | Hillhouse | 216/92 |
| 3,756,898 | 9/1973 | Frantzen et al. | 156/345 |
| 4,240,880 | 12/1980 | Tsuchibuchi et al. | 204/15 |
| 4,341,841 | 7/1982 | Ohno et al. | 428/414 |
| 4,482,425 | 11/1984 | Battey | 216/90 |
| 4,501,636 | 2/1985 | Valley | 156/345 |
| 4,624,729 | 11/1986 | Bresciani et al. | 156/345 |
| 4,715,686 | 12/1987 | Iwashita et al. | 350/339 |
| 4,826,556 | 5/1989 | Kobayashi | 156/345 |
| 4,846,868 | 7/1989 | Aratani | 156/345 |
| 4,953,952 | 9/1990 | Okumura et al. | . |
| 4,980,017 | 12/1990 | Kaji et al. | 156/642 |
| 5,000,795 | 3/1991 | Chung et al. | 134/37 |
| 5,002,627 | 3/1991 | Scheithauer et al. | . |
| 5,042,918 | 8/1991 | Suzuki | 359/59 |
| 5,082,518 | 1/1992 | Molinaro | 156/345 |
| 5,112,437 | 5/1992 | Watanabe et al. | 438/706 |
| 5,112,453 | 5/1992 | Behr et al. | 204/129.2 |
| 5,159,787 | 11/1992 | Suenaga et al. | 51/326 |
| 5,164,018 | 11/1992 | Barcelona, Jr. | . |
| 5,246,540 | 9/1993 | Soda | 216/97 |
| 5,251,980 | 10/1993 | Hiraoka et al. | 374/7 |
| 5,277,715 | 1/1994 | Cathey | 134/2 |
| 5,319,479 | 6/1994 | Yamada et al. | . |
| 5,371,619 | 12/1994 | Sirkin et al. | . |
| 5,378,308 | 1/1995 | Thoms | . |
| 5,389,148 | 2/1995 | Matsunaga | . |
| 5,429,711 | 7/1995 | Watanabe et al. | 216/52 |
| 5,434,433 | 7/1995 | Takasu et al. | 257/59 |
| 5,505,804 | 4/1996 | Mizuguchi et al. | 156/154 |
| 5,514,850 | 5/1996 | Miyazaki et al. | . |
| 5,540,784 | 7/1996 | Ranes | 134/10 |
| 5,543,181 | 8/1996 | Fehn et al. | . |
| 5,654,057 | 8/1997 | Kitajima et al. | 428/64.1 |
| 5,701,165 | 12/1997 | Kubo et al. | . |
| 5,766,493 | 6/1998 | Shin | . |
| 5,767,931 | 6/1998 | Paczkowski | . |
| 5,781,255 | 7/1998 | Yamamoto et al. | . |
| 5,788,871 | 8/1998 | Huh | 216/64 |
| 5,808,715 | 9/1998 | Tsai et al. | . |
| 5,818,559 | 10/1998 | Yoshida | 349/122 |
| 5,819,434 | 10/1998 | Herchen et al. | 23/232 |
| 5,835,176 | 11/1998 | Jeong et al. | . |

FOREIGN PATENT DOCUMENTS

| | | |
|---|---|---|
| 36 11 387 | 10/1987 | (DE) . |
| 38 53 904 | 10/1995 | (DE) . |
| 0474474 | 3/1992 | (EP) . |

(List continued on next page.)

*Primary Examiner*—Randy Gulakowski
*Assistant Examiner*—Shamim Ahmed
(74) *Attorney, Agent, or Firm*—Long, Aldridge & Norman LLP

(57) ABSTRACT

In a method of fabricating a substrate, a substrate is submerged into a chemical bath so that the thickness of the substrate changes. The temperature of the chemical bath is monitored to ascertain a change in the thickness of the substrate.

51 Claims, 6 Drawing Sheets

FOREIGN PATENT DOCUMENTS

| | | |
|---|---|---|
| 0 586 147 | 3/1994 | (EP) . |
| 0 659 521 | 6/1995 | (EP) . |
| 2 178 894 | 2/1987 | (GB) . |
| 2 178 895 | 2/1987 | (GB) . |
| 60-163435 | 8/1985 | (JP) . |
| 1-189631 | 7/1989 | (JP) . |
| 2-141703 | 5/1990 | (JP) . |
| 2-196222 | 8/1990 | (JP) . |
| 2-138459 | 11/1990 | (JP) . |
| 3-22390 | 1/1991 | (JP) . |
| 4-163528 | 6/1992 | (JP) . |
| 4-116619 | 8/1992 | (JP) . |
| 5-06101 | 3/1993 | (JP) . |
| 5061011 | 3/1993 | (JP) . |
| 5249422 | 9/1993 | (JP) . |
| 5249423 | 9/1993 | (JP) . |
| 7168172 | 7/1995 | (JP) . |

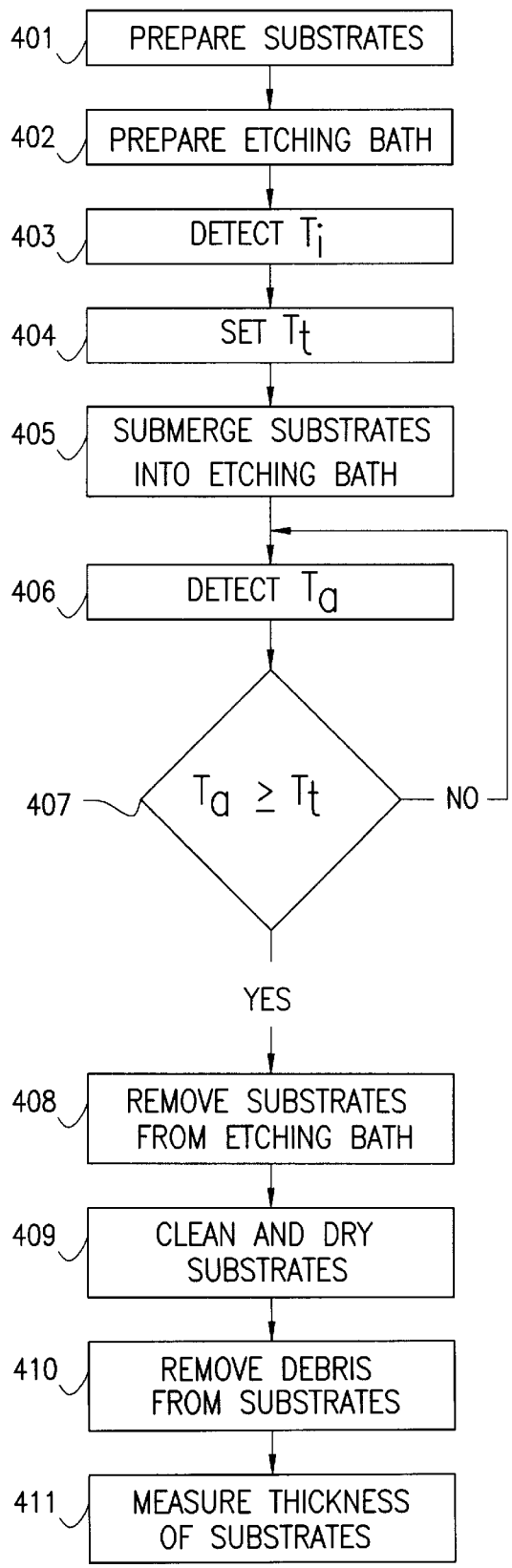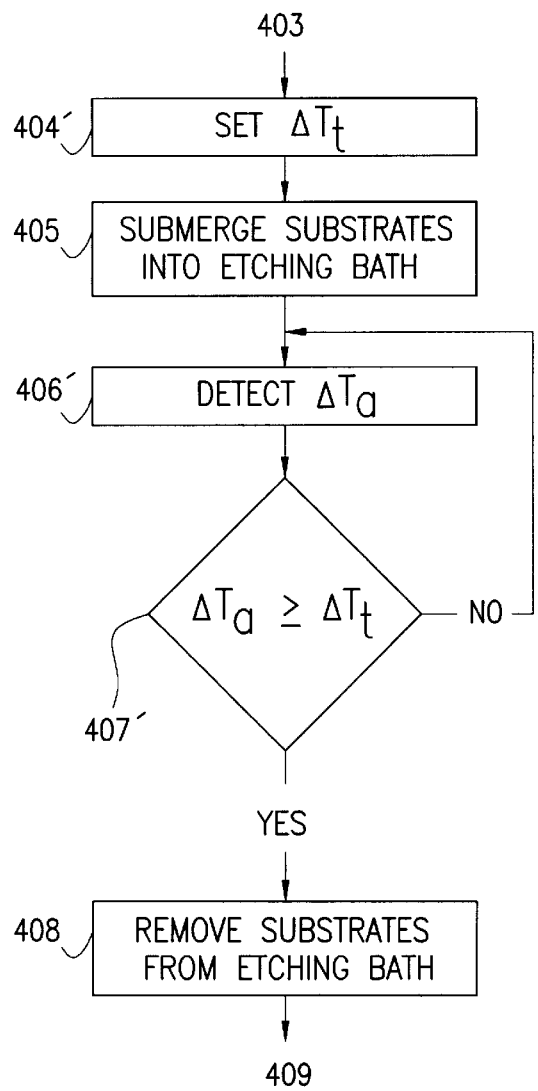
FIG.4A
FIG.4B

METHOD OF FABRICATING A SUBSTRATE

This is a continuation-in-part of a application Ser. No. 08/549,442 filed on Oct. 27, 1995, U.S. Pat. No. 5,766,493 which is incorporated herein by reference.

BACKGROUND OF THE INVENTION

1. Field of the Invention

The present invention relates to a method of fabricating a substrate, and more particularly, to a method of fabricating a substrate for a liquid crystal display. Although the present invention is discussed in detail with respect to a substrate for a liquid crystal display, the present invention is applicable to a wide variety of devices including substrates similar to those used in a display.

2. Discussion of the Related Art

Generally, in a liquid crystal display, upper and lower substrates are joined. A substrate having a pixel electrode and switching device in a matrix, and a substrate having a color filter arranged to realize colors and a common electrode are attached to each other. Liquid crystal is injected between the two substrates, which are in turn sealed. When an electric field is applied externally, the liquid crystal moves according to the electric field so that an image is displayed by light passing through the substrates.

As shown in FIG. 1, a conventional liquid crystal display includes liquid crystal 5 having light transmissivity that varies with electric field, a first transparent substrate 3 (lower substrate) on which electric wire is formed to apply an electric field to a selected portion, and a second transparent substrate 4 (color filter substrate). The liquid crystal 5 is injected between substrates 3 and 4. Then, they are sealed by a sealant 6. Polarizing plates 2-1 and 2-2 are attached to substrates 3 and 4. A back light 1 for producing light is fastened to the bottom of the lower substrate.

In the first transparent substrate, a scanning line, a data line, a pixel electrode, and switching means for controlling an electric field to the pixel electrode are arranged in a matrix. To the second transparent substrate, the common electrode and color filter are attached. Leads and pads for receiving external signals are formed on the substrates.

A method of fabricating such a liquid crystal display will be discussed below.

On a transparent substrate, such as glass, several hundred thousand to several million unit pixel electrodes are disposed along with control devices for controlling data to be applied to those pixel electrodes, and data lines and scanning lines for externally applying a video signal are formed. This constitutes first transparent substrate 3.

On another transparent substrate, a color filter and a common electrode for forming colors by passing light controlled only by the pixel electrodes are disposed to form second transparent substrate 4. After the lower and upper substrates are assembled, a sealant is spread thereon to seal them. The two substrates are arranged to be joined. The liquid crystal is injected therebetween, and finally the liquid crystal injection hole is closed so that the liquid crystal is not discharged externally.

After the liquid crystal sealing process, polarizing plates 2-1 and 2-2 are attached to the substrates. In order to externally apply a signal, a drive IC is connected to the leads. A back light, that is, light emitting means, and attaching means are assembled under the lower substrate to complete the liquid crystal display.

In fabricating the upper and lower substrates according to the conventional method, rinsing/deposition or etching equipment is used through several tens of processes. Here, physical forces may be applied to the transparent substrates during the processes. Further, the substrates undergo heating and cooling processes which can damage the substrates, if fragile.

In the conventional technique, transparent glass is used for the substrates in manufacturing the liquid crystal display. Commercially available glass assembly (upper and lower substrates combined) is usually 1.4 mm-thick, for example. To reduce the weight of the liquid crystal display, a single substrate of 0.7 mm, for example, has been used. In the conventional technique described above, if the thickness of the substrate is determined at the initial stage, the same thickness is maintained to the final product.

Since conventionally used glass is comparatively thick, it is protected against physical or thermal impacts during procedure. However, if a thin substrate is used from the initial stage, the yield will decrease due to damage or deformation. For manufacturing the lower substrate and liquid crystal filling processes, the process of heating or cooling between 200–300° C. occurs more than ten times. In addition, a high-speed rotation process due to a rinsing or coating process is repeated. For this reason, the thickness of glass cannot become thinner. There are limitations in reducing the weight of a liquid crystal display. In order to solve these problems, the equipment must be improved or additional functions must be provided, which however would increase the cost of the final product.

SUMMARY OF THE INVENTION

The present invention has been made in view of the above circumstances and has as an object to overcome the problems and disadvantages of the prior art.

Another object of the present invention is to provide a method of fabricating a substrate that is light and thin.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a method of fabricating a substrate includes the steps of providing a first substrate having a first thickness; providing a second substrate having a second thickness; providing an inner layer between the first and second substrates; assembling the first substrate, the second substrate, and the inner layer using an adhesive; and reducing the thickness of at least one of the first and second substrates.

In another aspect of the present invention, a method of fabricating a substrate for a liquid crystal display includes steps of providing a first transparent substrate having a first thickness; providing a second transparent substrate having a second thickness; assembling the first and second transparent substrates to provide a space between the first and second transparent substrates; reducing at least one of the first and second thickness; injecting a liquid crystal into the space between the first and second transparent substrates; and sealing the space between the first and second transparent substrates.

In another aspect of the present invention, a method of fabricating a liquid crystal display includes the steps of providing a first transparent substrate having a first thickness; providing a second transparent substrate having a second thickness; assembling the first and second transparent substrates to provide a space between the first and second transparent substrates; reducing at least one of the first and second thicknesses; injecting a liquid crystal into the space between the first and second transparent substrates; and sealing the space between the first and second transparent substrates.

In another aspect of the present invention, a method of fabricating a substrate includes the steps of submerging at least part of said substrate into a chemical bath to change a thickness of said substrate and detecting a temperature of said chemical bath to ascertain an amount of change in said thickness of said substrate.

In another aspect of the present invention, a method of fabricating a substrate assembly for a liquid crystal display device includes the steps of assembling a first substrate and a second substrate to form a substrate assembly having a thickness; substantially submerging said substrate assembly into a chemical bath to change said thickness of said substrate assembly; detecting a temperature of said chemical bath to ascertain an amount of change in said thickness of said substrate assembly; and removing said substrate assembly from said chemical bath according to said step of detecting.

In a further aspect of the present invention, a method of fabricating a substrate assembly for a liquid crystal display device includes the steps of forming at least one thin film transistor and at least one pixel electrode in a matrix, a scanning line, and a data line on a first substrate having a first thickness, wherein said first substrate is transparent; forming a color filter on a second substrate having a second thickness, wherein said second substrate is transparent; assembling said first and second substrates to form said substrate assembly having a third thickness, wherein said first and second substrates form outer surfaces of said substrate assembly, and said thin film transistor, pixel electrode, scanning line, data line, and color filter are inside said substrate assembly; providing an etching bath; submerging said substrate assembly into said etching bath to reduce said third thickness; detecting a temperature of said etching bath to ascertain an amount of change in said third thickness; and removing said substrate assembly from said chemical bath according to said step of detecting.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

In the drawings:

FIGS. 4A and 4B are flowcharts describing a process of fabricating a substrate according to a third embodiment of the present invention;

DETAILED DESCRIPTION OF THE PREFERRED EMBODIMENTS

Reference will now be made in detail to the preferred embodiments of the invention, examples of which are illustrated in the accompanying drawings.

Figure 1:
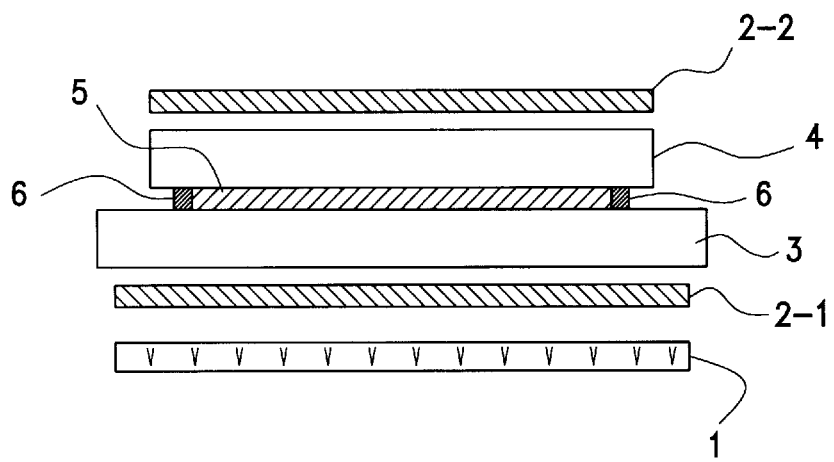
FIG. 1 is a schematic cross-sectional view of a conventional substrate.
Figure 2A:
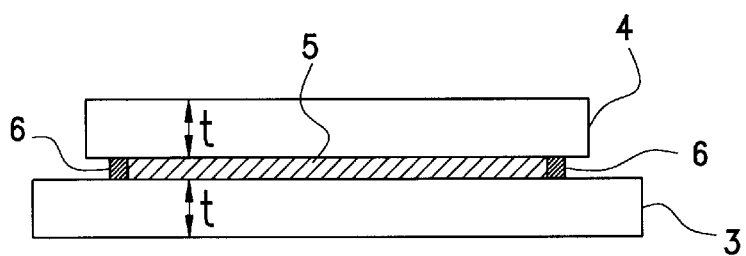
FIGS. 2A and 2B are schematic cross-sectional views of a first embodiment of a substrate of the present invention.

As shown in FIG. 2A, in a first embodiment, upper substrate 4 (the second transparent substrate) and lower substrate 3 (the first transparent substrate), which have thicknesses t, are joined. An interlevel material 5 is injected therebetween. The joined substrates are sealed by sealant 6. The two substrates 3 and 4 are completely closed by sealant 6.

The overall thickness of the upper and lower substrates is the sum of the thickness of the transparent substrates and the thickness of interlevel material 5. The thickness between the upper and lower substrates is the thickness of the interlevel material, which is very small. Therefore, the actual thickness of the substrates when joined is about 2t.

Figure 2B:
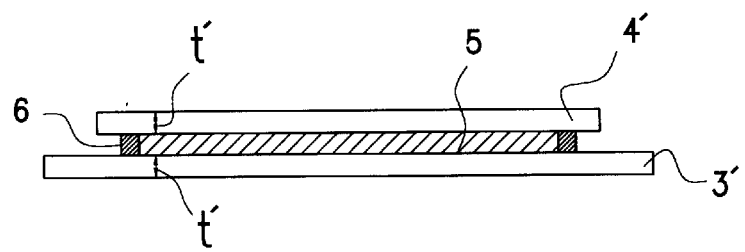

In this condition, when the outer surface of the joined upper and lower substrates is etched or polished using a polishing agent so as to reduce their thickness, the thickness can be controlled as desired. As shown in FIG. 2B, the thickness of upper and lower substrates 4' and 3' becomes 2t' (after etching or polishing). In addition, upper and lower substrates of different thicknesses may be used initially. The upper and lower substrates 3 and 4 may be made of a transparent insulator, a metal plate, or a semiconductor plate. The upper and lower substrates may be made of the same or different material to fabricate lightweight, thin substrates.

The following three methods may be used to polish the upper and lower substrates:

(1) mechanical method: the joined upper and lower substrates are mechanically polished using sandpaper or a polishing device employing a polishing agent, while being sprayed with a coolant;

(2) chemical method: the substrates are etched using a solution, such as a strong acid, for dissolving them (this does not involve substrate damage because there is no physical force); and (3) using a combination of both methods (1) and (2).

Figure 3A:
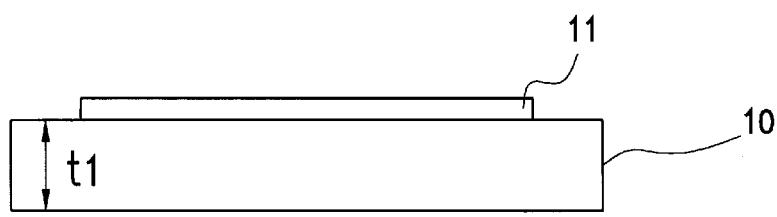
FIGS. 3A–3G are schematic cross-sectional views of a second embodiment of a substrate of the present invention.

As shown in FIG. 3A, in a second embodiment, substrate 10 of thickness $t_1$ is used to form element 11 of a thin-film transistor (TFT), i.e., the switching device, pixel electrode, scanning line and data line in the same method as the conventional manufacturing process. This forms first substrate 10, which is the lower substrate.

Figure 3B:

In FIG. 3B, substrate 20 of thickness $t_2$ is used to fabricate color filter 21 in the same method as the conventional process to make the second substrate 20, which is the upper substrate. Here, thicknesses $t_1$ and $t_2$ may be different or the same.

Figure 3C:
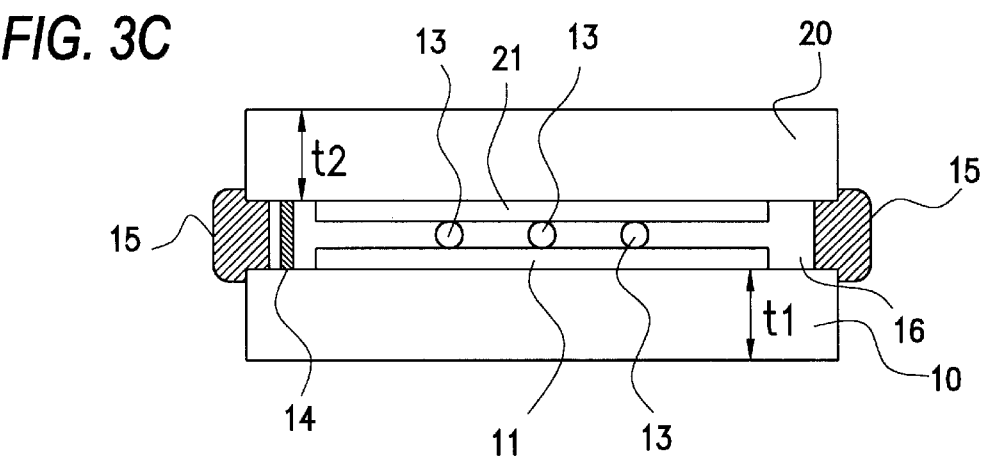

As shown in FIG. 3C, after a process of coating an orientation layer for orienting liquid crystal onto the upper and lower substrates, a spacer 13 is sprayed in order to maintain a constant distance between the upper and lower substrates. A sealant 14 is provided on the substrates except at liquid crystal injection hole 16 to prevent the liquid crystal from discharging. Thereafter, the upper and lower substrates are joined.

Figure 3D:
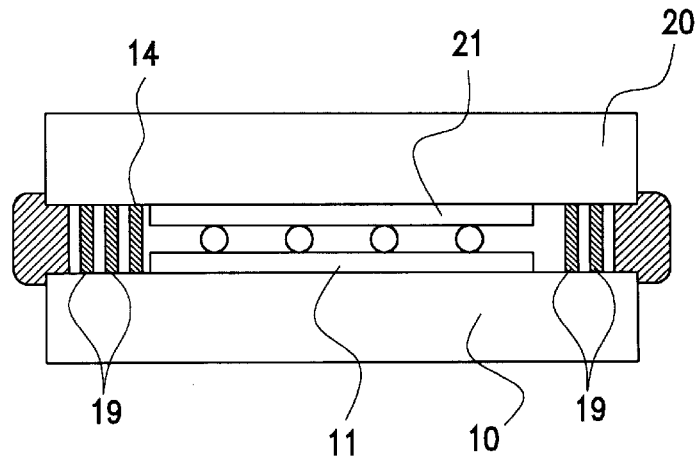

In order to completely prevent foreign materials or strong acid from entering between the two substrates, auxiliary sealant 19 may be used in addition to sealant 14, as shown in FIG. 3D. Here, the material used for auxiliary sealant 19 may be the same as or different from the material used for sealant 14 and can be processed at the same time.

Figure 3E:
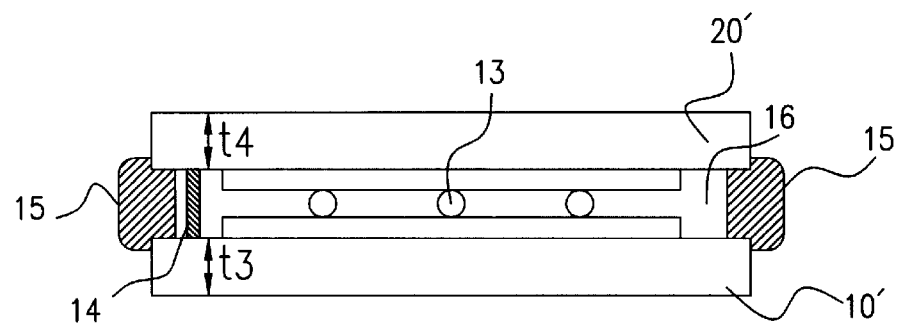

During the next process of etching the substrates to prevent foreign materials or strong acid from entering between the first and second substrates, i.e., to prevent foreign materials or strong acid from entering TFT device 11 and color filter 21, acid-resistant sealant 15 is used. After these processes, when the substrates are put into a strong acid, for example, a solution for etching glass substrates at a high speed, and etched for a predetermined time, the thicknesses of the upper and lower substrates are reduced from $t_2$ to $t_4$ and from $t_1$ to $t_3$, as shown in FIG. 3E. Thus, thinner and lighter upper and lower substrates 20' and 10' are obtained. In order to reduce the thickness of the substrates, sandpaper or a polishing device using a polishing agent may be used physically, instead of the etching, or both.

Figure 3F:
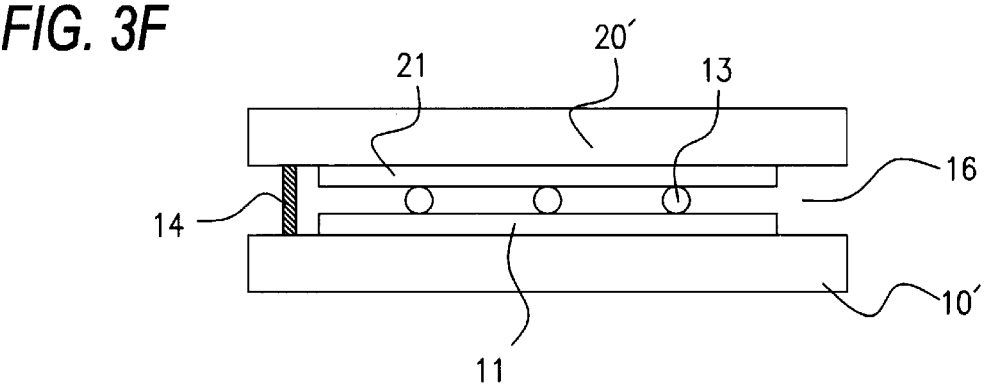
Figure 3G:
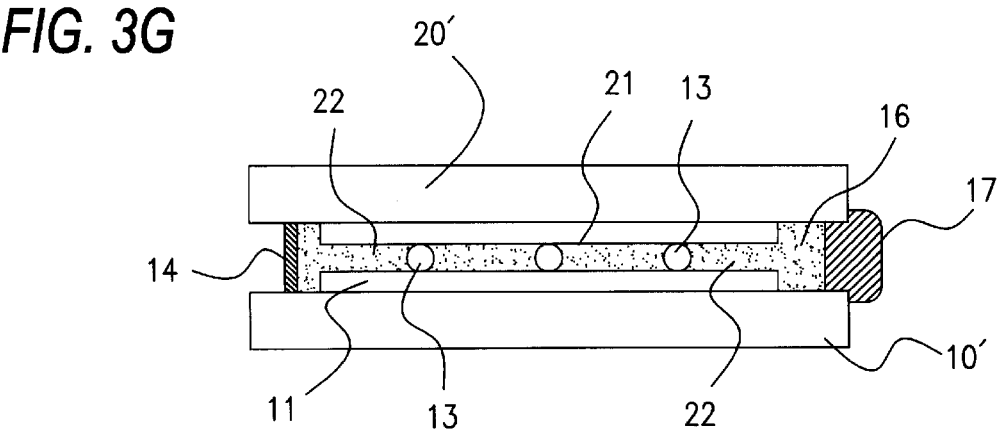

After the etching is finished, minute scratches are polished, and unnecessary substrate portions are removed using a substrate cutter, as shown in FIG. 3F. Here, acid-resistant sealant 15 and auxiliary sealant 19 are also removed. As shown in FIG. 3G, after the substrates are cut, liquid crystal 22 is injected through liquid crystal injection hole 16. The injection hole 16 is sealed by sealant 17 to prevent the liquid crystal from discharging, thus completing the process.

According to another method, similar to the method in FIGS. 3A–3G, the first and second substrates are joined and then liquid crystal is injected therebetween. The first and second substrates are sealed by acid-resistant sealant 15. Subsequently, the first and second substrates are polished using the polishing device or chemical solution, as described above. The succeeding processes are the same as the conventional processes.

Although, as described above, both the first and second substrates are cut, only one of the first and second substrates may be cut, and still obtain the advantageous effect of the present invention. For instance, if the first substrate is glass and the second substrate is plastic, only the first or second substrate may be cut. Further, if the first substrate is a silicon wafer and the second substrate is plastic, the first or second substrate only may be polished.

Accordingly, in the present invention, the first and second substrates are sealed by an acid-resistant sealant, and their outer surfaces are chemically etched. Then, the portion sealed by an acid-resistant sealant is cut. Prior to the joining of the first and second substrates, a sealant is used for sealing the structure. In this case, the structure may have multiple substrates.

As described above, in the present invention, during a process of making pixels and a color filter during which the substrates receive severe physical or thermal impacts, substrates of a stable thickness are used. The two substrates are joined before or after liquid crystal is injected. After the process of receiving physical or thermal impacts, the substrates are polished using a polishing device employing a polishing agent, or by wet etching. Through this process, the thickness of the substrates is uniformly reduced, decreasing the number of poor quality products and obtaining light and thin substrates.

In other embodiments, instead of controlling the thickness of the substrate by monitoring the etching time, alternative methods of controlling the thickness of the substrate without necessarily monitoring the etching time are employed. When the substrate is placed in a chemical etching solution, the chemical solution reacts with the substrate to reduce its thickness. During this chemical reaction, heat is given off to the chemical etching solution. Thus, the thickness of the substrate may be controlled based on the change in the temperature of the etching bath.

For example, in the case of $SiO_2$ constituting 60% of a glass substrate, the $SiO_2$ is dissolved preferably by an HF solution in the etching bath and the remaining oxide constituting the glass substrate dissolve into the etching bath as residual particles. As a result, the thickness of the glass substrate is reduced with high precision and accuracy. At this time, the HF and $SiO_2$ react as follows:

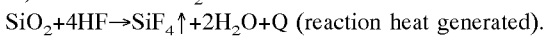
$SiO_2 + 4HF \rightarrow SiF_4\uparrow + 2H_2O + Q$ (reaction heat generated).

An exothermic reaction predominantly occurs in the wet etch process of glass material in HF solution. In general, the reaction energy of a chemical reaction is proportional to the number of moles of the compound used in the reaction. Therefore, with a sufficient amount of the HF solution, the reaction energy is proportional to the number of moles of the $SiO_2$ used in the reaction. As a result, the amount of $SiO_2$ of the glass substrate can be determined from the total reaction energy.

The temperature of the etching bath is affected by the reaction energy because the temperature of the etching bath can be represented by the expression:

$Q = m \cdot C \cdot \Delta T$, where $Q$ = reaction energy, $m$ = the mass of the etching bath (m), $C$ = the heat capacity of the etching bath, and $\Delta T$ = the change of the temperature of the etching bath.

Since the mass m and the heat capacity C of the etching bath effectively stay constant throughout a given etching process, only the reaction energy generated from the etching reaction changes the temperature of the etchant. Thus, if the change in the temperature of the etching bath $\Delta T$ is known, the reaction energy can be obtained. As a result, the reduction in the thickness of the glass substrate can be obtained from the change in the temperature of the etching bath.

In order to reduce the thickness of the glass substrate by a desired amount $\Delta t_d$, the reaction energy Q corresponding to the predetermined thickness is determined. Then, the change in the temperature $\Delta T$ of a given etching bath is obtained based on the reaction energy. The temperature of the etching bath for stopping the etching process can be determined based on the change in the temperature $\Delta T$ and the initial temperature $T_i$ of the etching bath. As a result, regardless of the chemical concentration of the etching bath, the etching end point is automatically determined by the temperature of the etching bath.

Based on the above principle, the relationship between the change in the temperature of the etching bath and the amount of reduction in thickness of the substrate is as follows:

$\Delta T = (k_r \cdot N \cdot \Delta t)/m$, where $\Delta T$ = a change in temperature, $k_r$ = a reaction coefficient for a given substrate type in a given etching bath, N = a number of substrates in a lot, $\Delta t$ = a change in thickness of the substrate, and m = mass of the etching bath.

An initial run is performed with a given number of substrates submerged into an etching bath for an arbitrary amount of time. The reduction in thickness and the rise in temperature are easily measured after the substrates are removed from the etching bath. Further, the mass of the etching bath may easily be measured. Thus, the reaction coefficient for a particular substrate type and a particular etching bath may be determined as follows from the initial run:

$$k_r=(\Delta T \cdot m)/(N \cdot \Delta t).$$

For example, if the initial run resulted in the lot of 25 glass substrate assemblies with a thickness of 2.2 mm being reduced to 1.8 mm in thickness with a 15° C. rise in temperature of a one kilogram mass of etching bath, the following relationship would be established for the given substrate assemblies and etching bath:

$$k_r=((15° \text{ C.})\cdot(1 \text{ kg})/(25\cdot(0.4 \text{ mm}))=1.5° \text{ C.}\cdot\text{kg/mm, and}$$

$$\Delta T=(1.5° \text{ C.}\cdot\text{kg/mm})\cdot N\cdot \Delta t.$$

Accordingly, if the thickness of 18 glass substrate assemblies of the same type is to be reduced by 0.4 mm, the 18 substrate assemblies should be submerged into the one kilogram etching bath of the same type until the temperature of the etching bath rises by 10.8° C. regardless of the etching time and the chemical concentration of the etching bath. Also, if the thickness of 25 glass substrate assemblies of the same type is to be reduced by 0.2 mm, the 25 substrate assemblies should be submerged into the one kilogram etching bath of the same type until the temperature of the etching bath rises by 7.5° C.

The above principle is applied in the following embodiments for fabricating substrates and substrate assemblies with reduced thicknesses.

In a third embodiment, substrates are fabricated according to the process as shown in FIG. 4A. At step 401, substrates are prepared. The substrates may be transparent insulators such as glass. For example, 0.7 mm or 1.1 mm glass substrates may be used. Also, different types of glass substrates made by different manufacturers such as CORNING® 7059, CORNING® 1737, and NEG® OA-2 may be used. Further, metal substrates or semiconductor substrates may also be fabricated according to the following processes.

At step 402, and etching bath is prepared by diluting undiluted HF solution with distilled water. Typically, for undiluted HF solution, commercially available HF solution with an HF concentrate between 40% and 60% is used. The amounts of the HF solution and distilled water are controlled in order to obtain an etching bath with a desirable HF concentration. Typically, an etching bath with an HF concentration between 5% and 20% is used. An HF concentration between 13% and 14% is preferred. However, the etching bath may have a lower HF concentration or a higher HF concentration up to the HF concentration in the undiluted HF solution. Thus, an HF solution of any concentration above 0% and below 100% may be used.

Table 1 shows the result of a first test run performed with a preferred HF concentration of 13.2% and 2.2 mm substrate assemblies. In the test run, the substrate assemblies were removed from the etching bath after the temperature of the etching bath increased by 15° C. in approximately 50 minutes. The result shows substantial uniformity and precision in etched thickness of the substrate assemblies.

TABLE 1

| Substrate Assembly Number | Initial Thickness (mm) | Final Thickness (mm) | Etched Thickness (mm) |
|---|---|---|---|
| 1 | 2.189 | 1.771 | 0.418 |
| 2 | 2.162 | 1.754 | 0.408 |
| 3 | 2.183 | 1.752 | 0.431 |
| 4 | 2.188 | 1.773 | 0.415 |
| 5 | 2.177 | 1.770 | 0.407 |
| 6 | 2.190 | 1.780 | 0.410 |
| 7 | 2.172 | 1.758 | 0.414 |
| 8 | 2.173 | 1.756 | 0.417 |
| 9 | 2.193 | 1.771 | 0.422 |
| 10 | 2.182 | 1.767 | 0.415 |
| 11 | 2.168 | 1.752 | 0.416 |
| 12 | 2.178 | 1.763 | 0.415 |
| 13 | 2.169 | 1.756 | 0.413 |
| 14 | 2.166 | 1.751 | 0.415 |
| 15 | 2.172 | 1.758 | 0.414 |
| 16 | 2.160 | 1.742 | 0.418 |
| 17 | 2.163 | 1.759 | 0.404 |
| 18 | 2.186 | 1.767 | 0.419 |
| 19 | 2.177 | 1.766 | 0.411 |
| 20 | 2.181 | 1.766 | 0.415 |
| 21 | 2.185 | 1.775 | 0.410 |
| 22 | 2.170 | 1.765 | 0.405 |
| 23 | 2.164 | 1.752 | 0.412 |
| 24 | 2.180 | 1.774 | 0.406 |
| 25 | 2.168 | 1.751 | 0.417 |
| Mean | 2.176 | 1.762 | 0.414 |
| Standard Deviation | 0.008 | 0.008 | 0.004 |

After the substrates and the etching bath are prepared, an initial run is made to determine the value of the reaction coefficient $k_r$ as discussed above. Also, the reaction coefficient $k_r$ may be known from previous runs performed with the same types of substrates and the etching bath.

At step 403, the initial temperature $T_i$ of the etching bath is measured. At step 404, based on the initial temperature $T_i$ and the mass m of the etching bath, the number of substrates N to be etched simultaneously, the determined reaction coefficient $k_r$, and the desired amount of thickness to be etched $\Delta t_d$, the target temperature $T_t$ is set as:

$$T_t=T_i+(k_r \cdot N \cdot \Delta t_d)/m.$$

Then, at step 405, the substrates are submerged into the prepared etching bath. At this time, nitrogen gas is preferably supplied to enhance the etching process. The supplied nitrogen gas generate bubbles in the etching solution and stir the etching bath. The nitrogen gas is continuously supplied so that the stirring of the etchant can be continued when the etching process is performed. As a result, the etching process of the substrates is enhanced. Moreover, since the circulation of the etching solution continuously removes the residual oxides on the surfaces of the glass substrates resulting from the wet etch process, the surface uniformity of the substrates is improved.

The substrates and the etching bath react with each other. As a result, the temperature of the etching bath begins to rise. At step 406, the actual temperature $T_a$ of the etching bath is detected by a temperature sensor such as a thermistor in the etching bath. Since the temperature of the etching bath rises in proportion to the amount of the reaction energy generated by the etching process, it rises in proportion to the amount of the thickness etched from the substrates.

At step 407, the detected actual temperature $T_a$ of the etching bath is compared with the target temperature $T_t$. As long as the actual temperature $T_a$ is below the target temperature $T_t$, the steps 406 and 407 are repeated.

When the actual temperature $T_a$ reaches the target temperature, the substrates are removed from the etching bath at step 408. At step 409, the substrates are cleaned and dried. At step 410, the debris is removed from the surface of the substrates, and minor scratches may be polished. At step 411, the thicknesses of the substrates are measured to ensure that the substrates have a desirable thickness.

Alternatively, as shown in FIG. 4B at step 404', instead of setting the target temperature $T_t$, the target change in temperature $\Delta T_t$ from the initial temperature $T_i$ may be set based on the number of substrates to be etched simultaneously, the particular type of a substrate, the desired amount of thickness to be etched. At step 405, the substrates are submerged into the etching bath. At step 406', the actual temperature $T_a$ of the etching bath is detected, and the actual change in temperature $\Delta T_a$ is determined based on the actual temperature $T_a$ and the initial temperature $T_i$. At step 407', the actual change in temperature $\Delta T_a$ is compared to the target change in temperature $\Delta T_t$. When the actual change in temperature $\Delta T_a$ reaches the target change in temperature $\Delta T_t$, the substrates are removed from the etching solution at step 408. The remaining steps are identical to the above embodiment shown in FIG. 4A.

The 0.7 mm and 1.1 mm glass substrates used in the above fabrication process are typically reduced to thicknesses of about 0.5 mm and 0.7 mm, respectively, for use in the liquid crystal display. However, the thicknesses of the substrates may be further reduced to at least 0.3 mm. The substrate thickness may be reduced even more depending on the type of application.

Figure 5:
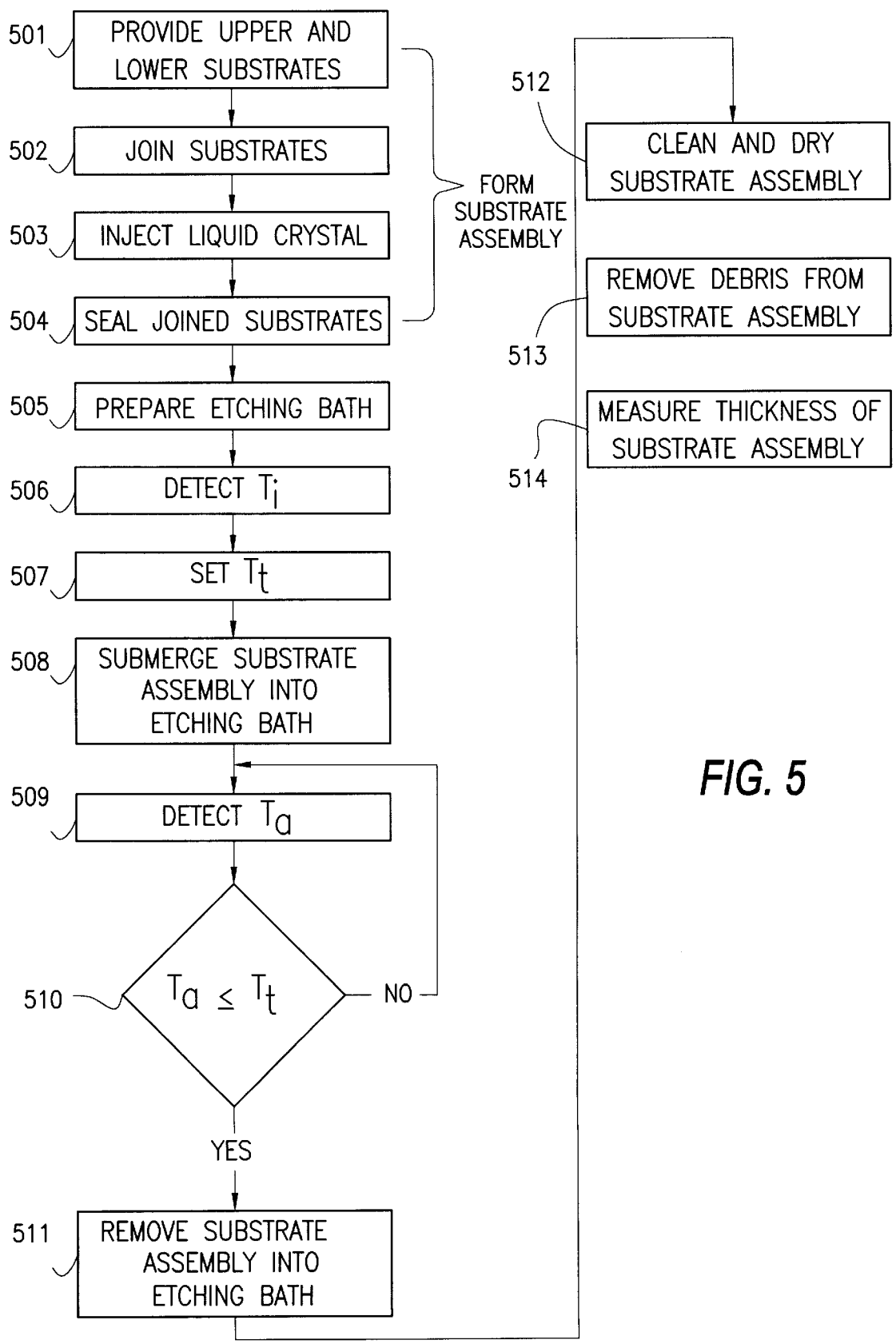
FIG. 5 is a flowchart showing a process of fabricating a substrate assembly according to a fourth embodiment of the present invention.

In the fourth embodiment, substrate assemblies are fabricated according to the process shown in FIG. 5. At steps 501 through 504, each substrate assembly according to the first embodiment and FIG. 2A is prepared. At step 501, an upper substrate 4 and a lower substrate 3 are provided. The upper and lower substrates may be selected from the group of substrates discussed above in the third embodiment. For example, each of the upper and lower substrates may be a transparent substrate such as glass with thickness t of about 0.7 mm. At step 502, the upper substrate 4 and lower substrate 3 are joined. At step 503, an interlevel material 5 such as liquid crystal is injected therebetween. At step 504, the joined substrates are sealed by sealant 6. The two substrates 3 and 4 are completely closed by sealant 6. The overall thickness of each substrate assembly is about 1.4 mm since the thickness of the interlevel material is very small in comparison with the thickness of the substrates.

At step 505, an etching bath is prepared by mixing distilled water with preferably hydrofluoric acid (HF) as discussed above in the third embodiment in conjunction with step 402.

After the substrate assemblies and the etching bath are prepared, an initial run is made to determine the value of the reaction coefficient $k_r$ as discussed above. Also, the reaction coefficient $k_r$ may be known from previous runs performed with the same types of substrate assemblies and the etching bath.

At step 506, the initial temperature $T_i$ of the etching bath is measured. At step 507, based on the initial temperature $T_i$ and the mass m of the etching bath, the number of substrate assemblies N to be etched simultaneously, the determined reaction coefficient $k_r$, and the desired amount of thickness to be etched $\Delta t_d$, the target temperature $T_t$ is set as:

$$T_t = T_i + (k_r \cdot N \cdot \Delta t_d)/m.$$

Then, at step 508, the substrate assemblies are submerged into the prepared etching bath. The nitrogen gas is continuously supplied so that the stirring of the etchant can be continued when the etching process is performed as discussed above in the third embodiment in conjunction with step 405.

As discussed above, the substrate assemblies and the etching bath react with each other.

As a result, the temperature of the etching bath begins to rise. At step 509, the actual temperature $T_a$ of the etching bath is detected by a temperature sensor in the etching bath.

At step 510, the detected actual temperature $T_a$ of the etching bath is compared with the target temperature $T_t$. As long as the actual temperature $T_a$ is below the target temperature $T_t$, the steps 509 and 510 are repeated.

When the actual temperature $T_a$ reaches the target temperature, the substrate assemblies are removed from the etching bath at step 511. At step 512, the substrate assemblies are cleaned and dried. At step 513, the residue or debris is removed from the surface of the upper and lower substrates. At step 514, the thicknesses of the substrate assemblies are measured to ensure that the substrate assemblies have desirable thicknesses.

The alternative method as shown in FIG. 4B may also be used to control the thicknesses of the substrate assemblies as discussed above in conjunction with the fourth embodiment.

The 1.4 mm glass substrate assemblies used in the above fabrication process are typically reduced to a thickness less than 1.4 mm, e.g., 1.0 mm, for use in the liquid crystal display.

Table 2 shows the result of a second test run performed with the 1.4 mm substrate assemblies and an etching bath with an HF concentration of 10.6%. The substrate assemblies were submerged into the etching bath until the temperature of the etching bath rose by 15° C. in approximately 75 minutes.

TABLE 2

| Substrate Assembly Number | Initial Thickness (mm) | Final Thickness (mm) | Etched Thickness (mm) |
|---|---|---|---|
| 1 | 1.431 | 0.986 | 0.445 |
| 2 | 1.430 | 0.996 | 0.434 |
| 3 | 1.426 | 0.981 | 0.445 |
| 4 | 1.427 | 0.986 | 0.441 |
| 5 | 1.425 | 0.993 | 0.432 |
| 6 | 1.428 | 0.989 | 0.439 |
| 7 | 1.434 | 0.983 | 0.451 |
| 8 | 1.442 | 1.002 | 0.440 |
| 9 | 1.435 | 0.999 | 0.436 |
| 10 | 1.427 | 0.998 | 0.429 |
| 11 | 1.436 | 0.991 | 0.445 |
| 12 | 1.425 | 0.990 | 0.435 |
| 13 | 1.431 | 0.984 | 0.447 |
| 14 | 1.435 | 0.984 | 0.451 |
| 15 | 1.435 | 0.987 | 0.448 |
| 16 | 1.421 | 0.993 | 0.428 |
| 17 | 1.430 | 0.979 | 0.451 |
| 18 | 1.441 | 0.982 | 0.459 |
| 19 | 1.432 | 0.996 | 0.436 |
| 20 | 1.424 | 0.989 | 0.435 |
| 21 | 1.443 | 0.996 | 0.447 |
| 22 | 1.436 | 0.997 | 0.439 |
| Mean | 1.432 | 0.990 | 0.441 |
| Standard Deviation | 0.006 | 0.007 | 0.008 |

TABLE 3

| Substrate Assembly Number | Initial Thickness (mm) | Final Thickness (mm) | Etched Thickness (mm) |
|---|---|---|---|
| 1 | 1.436 | 0.996 | 0.440 |
| 2 | 1.432 | 0.992 | 0.440 |
| 3 | 1.429 | 0.996 | 0.433 |
| 4 | 1.412 | 0.979 | 0.433 |
| 5 | 1.422 | 0.980 | 0.442 |
| 6 | 1.431 | 0.994 | 0.437 |
| 7 | 1.429 | 0.998 | 0.431 |
| 8 | 1.438 | 1.004 | 0.434 |
| 9 | 1.431 | 1.002 | 0.429 |
| 10 | 1.432 | 0.997 | 0.435 |
| 11 | 1.420 | 0.987 | 0.433 |
| 12 | 1.418 | 0.987 | 0.433 |
| 13 | 1.428 | 0.985 | 0.433 |
| 14 | 1.428 | 0.995 | 0.430 |
| 15 | 1.429 | 0.998 | 0.435 |
| 16 | 1.428 | 0.994 | 0.429 |
| 17 | 1.428 | 0.999 | 0.426 |
| 18 | 1.432 | 1.002 | 0.433 |
| 19 | 1.435 | 0.999 | 0.430 |
| 20 | 1.437 | 1.005 | 0.436 |
| 21 | 1.433 | 1.001 | 0.439 |
| 22 | 1.429 | 0.994 | 0.435 |
| Mean | 1.429 | 0.995 | 0.434 |
| Standard Deviation | 0.006 | 0.007 | 0.004 |

Table 3 shows the result of a third test run performed with the same type and number of substrate assemblies and an etching bath with an HF concentration of 11.3%. When the temperature of the etching bath rose by 15° C. in approximately 65 minutes, the substrate assemblies were removed from the etching bath. As shown in Tables 2 and 3, the amount of the etched thickness was substantially the same for both of the test runs performed with etchings solutions having different HF concentrations.

The thicknesses of the initial substrate assemblies slightly vary as shown in the above Tables 1–3. Tables 1–3 also show that the standard deviation of the thicknesses of the substrate assemblies remains substantially the same even after the etching process. Thus, the etching methods disclosed herein provide resultant substrates with substantially uniform and precise thicknesses.

Figure 6:
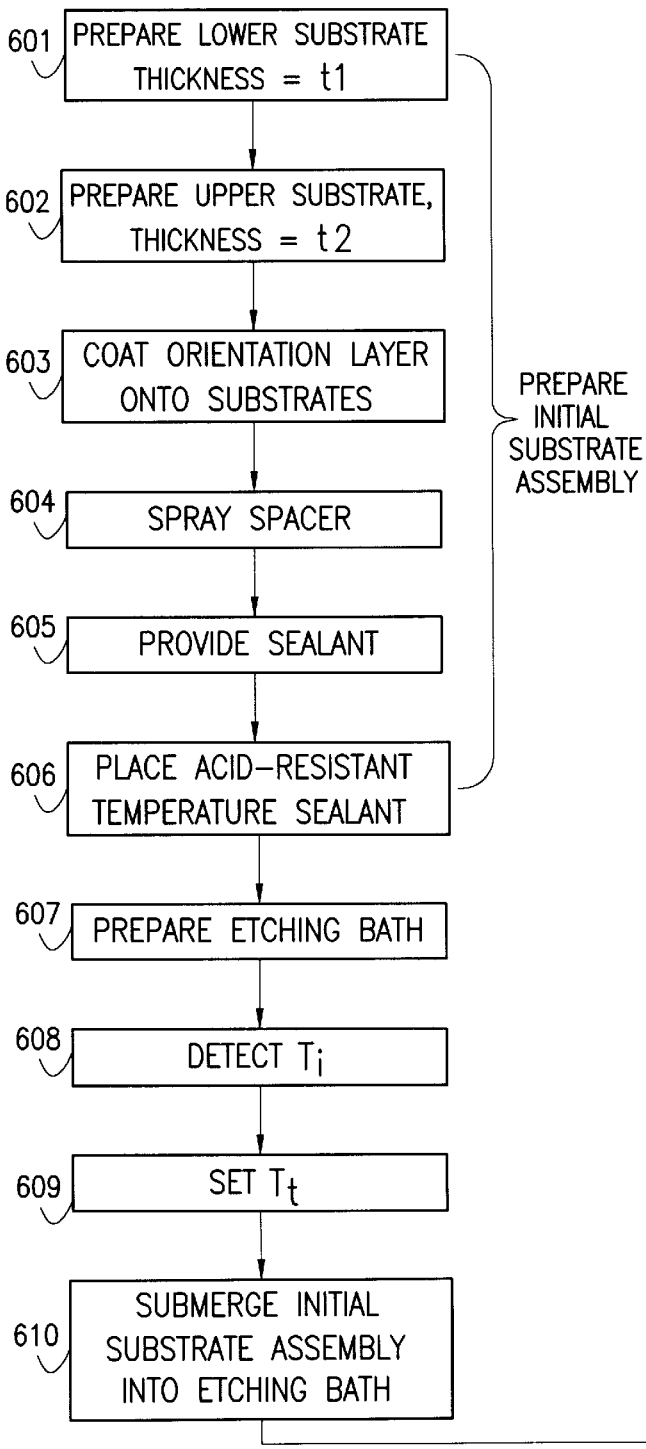
FIG. 6 is a flowchart showing a process of fabrication a substrate assembly according to a fifth embodiment of the present invention.
Figure 6:
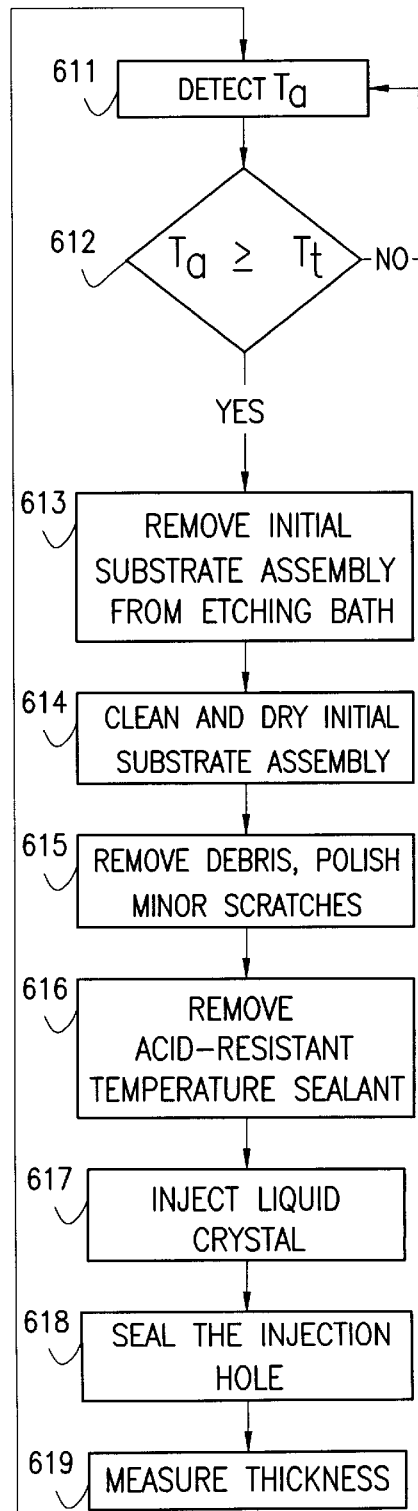

In the fifth embodiment, substrate assemblies are fabricated according to the method shown in FIG. 6. At steps 601 through 606, each initial substrate assembly is formed as shown in FIGS. 3A through 3D according to the second embodiment. At step 601, as shown in FIG. 3A, substrate 10 of thickness $t_1$ is used to form element 11 of a thin-film transistor (TFT), i.e., the switching element, pixel electrode, scanning line, and data line in the same method as the conventional manufacturing process. This forms first substrate 10 which is the lower substrate.

At step 602, as shown in FIG. 3B, substrate 20 of thickness $t_2$ is used to fabricate color filter 21 in the same method as the conventional process to form the second substrate 20, which is the upper substrate. Here, thicknesses $t_1$ and $t_2$ may be different or the same.

As in the third and fourth embodiments, the substrates may be selected from the group of substrates discussed above in the third embodiment. For example, each of the upper and lower substrates may be a transparent substrate such as glass with thickness t of about 0.7 mm.

At step 603, the upper and lower substrates are coated with an orientation layer for orienting liquid crystal. At step 604, a spacer 13 is sprayed as shown in FIG. 3C in order to maintain a constant distance between the upper and lower substrates. At step 605, a sealant 14 is provided on the substrates except at liquid crystal injection hole 16, and the upper and lower substrates are joined.

In order to completely prevent foreign materials or strong acid from entering between the two substrates, auxiliary sealant 19 may be used in addition to sealant 14, as shown in FIG. 3D. Here, the material used for auxiliary sealant 19 may be the same as or different from the material used for sealant 14 and can be processed at the same time.

At step 606, in order to prevent foreign materials or strong acid from entering between the first and second substrates, i.e., to prevent foreign materials or strong acid from entering TFT device 11 and color filter 21, acid-resistant temporary sealant 15 is placed between the upper and lower substrates to form each initial substrate assembly.

At step 607, an etching bath is prepared by mixing distilled water with hydrofluoric acid (HF) as discussed above in the third embodiment in conjunction with step 402.

As discussed above, after the initial substrate assemblies and the etching bath are prepared, an initial run is made to determine the value of the reaction coefficient $k_r$. Also, the reaction coefficient $k_r$ may be known from previous runs performed with the same types of substrates and the etching bath.

At step 608, the initial temperature $T_i$ of the etching bath is measured. At step 607, based on the initial temperature $T_i$ and the mass m of the etching bath, the number of substrate assemblies N to be etched simultaneously, the determined reaction coefficient $k_r$, and the desired amount of thickness to be etched $\Delta t_d$, the target temperature $T_t$ is set as:

$T_t = T_i + (k_r \cdot N \cdot \Delta t_d)/m$.

Then, at step 610, the initial substrate assemblies are submerged into the prepared etching bath. The nitrogen gas is continuously supplied so that the stirring of the etchant can be continued when the etching process is performed as discussed above in the third embodiment in conjunction with step 405.

As discussed above, the substrate assemblies and the etching bath react with each other. As a result, the temperature of the etching bath begins to rise. At step 611, the actual temperature $T_a$ of the etching bath is detected.

At step 612, the detected actual temperature $T_a$ of the etching bath is compared with the target temperature $T_t$. As long as the actual temperature $T_a$ is below the target temperature $T_t$, the steps 611 and 612 are repeated.

When the actual temperature $T_a$ reaches the target temperature, the substrate assemblies are removed from the etching bath at step 613. At step 614, the substrate assemblies are cleaned and dried. At step 615, the debris is removed from the surface of the upper and lower substrates, minor scratches are polished, and unnecessary portions of each substrate assembly are removed using a substrate cutter, resulting in the assembly shown in FIG. 3F. At step 616, the acid resistant temporary sealant and the auxiliary sealant 19 are removed.

At step 617, liquid crystal 22 is injected through liquid crystal injection hole 16. At step 618, the injection hole 16 is sealed by sealant 17 to prevent the liquid crystal from discharging, thus forming the final substrate assembly. At step 619, the thicknesses of the substrate assemblies are measured to ensure that the substrate assemblies have desirable thicknesses.

The alternative method of controlling the thickness of the substrates as shown in FIG. 4B may also be used in conjunction with the fifth embodiment.

The 1.4 mm glass substrate assemblies used in the above fabrication process are typically reduced to a thickness between 0.6 mm and 1.0 mm for use in the liquid crystal display.

According to the methods above, the present invention has the following advantages.

(a) There is no need to use an unstable thin substrate from the initial process, while still obtaining a stabilized process and using inexpensive substrates. This also reduces cost for equipment improvement and addition of functions.

(b) This method is stable, thus obtaining stable yield and allowing a competitive edge.

(c) The substrates are polished after the process of receiving physical or thermal impacts so as to control the thickness to obtain thin and light products, unlike a case in which, if a thin substrate is used at the very initial stage, its thickness cannot be reduced below a predetermined thickness due to possible damage and the procedure becomes limited.

(d) The substrates can be uniformly etched regardless of the chemical concentration of the etching bath by controlling the amount of etching based on the change in temperature of the etching bath.

(e) Since the substrate can be uniformly etched regardless of the chemical concentration of the etching bath, the etching bath may be reused and the consumption of the undiluted etching solution used in the preparation of the etching bath can be decreased.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of fabricating a substrate comprising the steps of:
    submerging at least a part of said substrate into a chemical bath to change a thickness of said substrate; and
    detecting a temperature of said chemical bath to ascertain an amount of change in said thickness of said substrate, the detecting step including:
        detecting an initial temperature of said chemical; and
        setting said predetermined temperature based on said initial temperature of said chemical bath and on a desired amount of change in said thickness of said substrate.

2. The method of fabricating a substrate according to claim 1, wherein said step of submerging comprises the step of submerging the whole of said substrate.

3. The method of fabricating a substrate according to claim 1, further comprising the step of removing said substrate from said chemical bath when said temperature reaches a predetermined temperature.

4. The method of fabricating a substrate according to claim 1, wherein
    the initial temperature of said chemical bath is measured before the step of submerging.

5. The method of fabricating a substrate according to claim 1, further comprising the step of detecting an initial temperature of said chemical bath before said step of submerging,
    wherein said step of detecting a temperature comprises the step of determining a change in temperature of said chemical bath from said initial temperature, and
    wherein said method further comprises the step of removing said substrate from said chemical bath when said change in temperature reaches a predetermined amount.

6. The method of fabricating a substrate according to claim 5, further comprising the step of setting said predetermined amount based on a desired change in said thickness of said substrate.

7. The method of fabricating a substrate according to claim 1, wherein said substrate is a transparent substrate for a liquid crystal display device.

8. The method of fabricating a substrate according to claim 1, further comprising the step of providing said chemical bath.

9. The method of fabricating a substrate according to claim 8, wherein said step of providing a chemical bath comprises the step of providing an etching bath, and
    wherein said step of submerging comprises the step of submerging said substrate into said etching bath to reduce said thickness of said substrate.

10. The method of fabricating a substrate according to claim 9, wherein said step of providing an etching bath comprises the step of providing a mixture of hydrofluoric acid and distilled water.

11. The method of fabricating a substrate according to claim 10, wherein a concentration of said hydrofluoric acid in said mixture is between 5% and 20%.

12. The method of fabricating a substrate according to claim 1, further comprising the steps of:
    cleaning and drying said substrate after said step of removing;
    removing debris or residue from the surface of said substrate after said step of cleaning and drying;
    polishing minor scratches on said substrate after said step of cleaning and drying; and
    measuring said thickness of said substrate after said step of removing.

13. A method of fabricating a substrate assembly for a liquid crystal display device comprising the steps of:
    assembling a first substrate and a second substrate to form a substrate assembly having a thickness;
    substantially submerging said substrate assembly into a chemical bath to change said thickness of said substrate assembly;
    detecting a temperature of said chemical bath to ascertain an amount of change in said thickness of said substrate assembly; and
    removing said substrate assembly from said chemical bath according to said step of detecting,
    wherein the detecting step includes:
        detecting an initial temperature of said chemical; and
        setting said predetermined temperature based on said initial temperature of said chemical bath and on a desired amount of change in said thickness of said substrate.

14. The method of fabricating a substrate assembly according to claim 13, wherein said step of substantially submerging includes the step of submerging the whole of said substrate assembly into said chemical bath.

15. The method of fabricating a substrate assembly according to claim 13, wherein said first and second substrates have different thicknesses.

16. The method of fabricating a substrate assembly according to claim 13, wherein said step of removing includes the step of removing said substrate assembly from said chemical bath when said temperature reaches a predetermined temperature.

17. The method of fabricating a substrate assembly according to claim 13, wherein
the initial temperature of said chemical bath is measured before the step of substantially submerging.

18. The method of fabricating a substrate assembly according to claim 13, further comprising the step of detecting an initial temperature of said chemical bath before said step of substantially submerging,
wherein said step of detecting a temperature includes the step of determining a change in temperature of said chemical bath from said initial temperature, and
wherein said step of removing includes the step of removing said substrate from said chemical bath when said change in temperature reaches a predetermined amount.

19. The method of fabricating a substrate assembly according to claim 18, further comprising the step of setting said predetermined amount based on a desired amount of change in said thickness of said substrate assembly.

20. The method of fabricating a substrate assembly according to claim 13,
wherein said step of assembling comprises the step of assembling includes the step of providing a liquid crystal layer between said first and second substrates.

21. The method of fabricating a substrate assembly according to claim 20, wherein said step of assembling further comprises the step of sealing said liquid crystal layer within said first and second substrates.

22. The method of fabricating a substrate assembly according to claim 13, wherein said step of assembling includes the step of using spacers to form a space in said substrate assembly between said first and second substrates, the method further comprising the steps of:
injecting liquid crystal into said space of said substrate assembly between said first and second substrates after said step of removing; and
sealing said space of said substrate assembly after said step of injecting.

23. The method of fabricating a substrate assembly according to claim 22, further comprising the step of temporarily sealing said space between said first and second substrates before said step of substantially submerging.

24. The method of fabricating a substrate assembly according to claim 13, wherein said first and second substrates are both transparent.

25. The method of fabricating a substrate assembly according to claim 13, further comprising the steps of:
forming a thin film transistor, a pixel electrode, a scanning line, and a data line on said first substrate before said step of assembling; and
forming a color filter on said second substrate before said step of assembling,
wherein said first and second substrates form outer surfaces of said substrate assembly, and said thin film transistor, pixel electrode, scanning line, data line, and color filter are inside said substrate assembly.

26. The method of fabricating a substrate assembly according to claim 13, further comprising the step of providing said chemical bath,
wherein said chemical bath is an etching bath, and
wherein said step of substantially submerging comprises the step of substantially submerging said substrate assembly into said etching bath to reduce said thickness of said substrate assembly.

27. The method of fabricating a substrate assembly according to claim 26, wherein said step of providing an etching bath comprises the step of providing a mixture of hydrofluoric acid and distilled water.

28. The method of fabricating a substrate assembly according to claim 27, wherein a concentration of hydrofluoric acid in said mixture is between 5% and 20%.

29. The method of fabricating a substrate assembly according to claim 13, further comprising the steps of:
cleaning and drying said substrate assembly after said step of removing;
removing debris or residue from the surface of said substrate assembly after said step of cleaning and drying;
polishing minor scratches on said substrate assembly after said step of cleaning and drying; and
measuring said thickness of said substrate assembly after said step of removing.

30. A method of fabricating a substrate assembly for a liquid crystal display device comprising the steps of:
forming at least one thin film transistor and at least one pixel electrode in a matrix, a scanning line, and a data line on a first substrate having a first thickness, wherein said first substrate is transparent;
forming a color filter on a second substrate having a second thickness, wherein said second substrate is transparent;
assembling said first and second substrates to form said substrate assembly having a third thickness, wherein said first and second substrates form outer surfaces of said substrate assembly, and said thin film transistor, pixel electrode, scanning line, data line, and color filter are inside said substrate assembly;
providing an etching bath;
submerging said substrate assembly into said etching bath to reduce said third thickness;
detecting a temperature of said etching bath to ascertain an amount of change in said third thickness; and
removing said substrate assembly from said chemical bath according to said step of detecting.

31. The method of fabricating a substrate assembly according to claim 30, wherein said first and second thicknesses are different from each other.

32. The method of fabricating a substrate assembly according to claim 30, wherein said step of removing includes the step of removing said substrate assembly from said etching bath when said temperature reaches a predetermined temperature.

33. The method of fabricating a substrate assembly according to claim 32, further comprising the steps of:
detecting an initial temperature of said etching bath before the step of submerging; and
setting said predetermined temperature based on said initial temperature of said etching bath and on a desired amount of reduction in said third thickness.

34. The method of fabricating a substrate assembly according to claim 30, further comprising the step of detecting an initial temperature of said etching bath before said step of submerging,
wherein said step of detecting a temperature includes the step of determining a change in temperature of said etching bath from said initial temperature, and
wherein said step of removing includes the step of removing said substrate from said etching bath when said change in temperature reaches a predetermined amount.

35. The method of fabricating a substrate assembly according to claim 34, further comprising the step of setting said predetermined amount based on a desired amount of reduction in said third thickness.

36. The method of fabricating a substrate assembly according to claim 30,
wherein said step of assembling includes the step of assembling includes the step of providing a liquid crystal layer between said first and second substrates.

37. The method of fabricating a substrate assembly according to claim 36, wherein said step of assembling further includes the step of sealing said liquid crystal layer within said first and second substrates.

38. The method of fabricating a substrate assembly according to claim 30, wherein said step of assembling includes the step of using spacers to form a space in said substrate assembly between said first and second substrates, the method further comprising the steps of:
injecting liquid crystal into said space of said substrate assembly between said first and second substrates after said step of removing; and
sealing said space of said substrate assembly after said step of injecting.

39. The method of fabricating a substrate assembly according to claim 38, further comprising the step of temporarily sealing said space between said first and second substrates before said step of submerging.

40. The method of fabricating a substrate assembly according to claim 30, wherein said step of providing an etching bath comprises the step of providing a mixture of hydrofluoric acid and distilled water.

41. The method of fabricating a substrate assembly according to claim 40, wherein a concentration of hydrofluoric acid in said mixture is between 5% and 20%.

42. The method of fabricating a substrate assembly according to claim 30, further comprising the steps of:
cleaning and drying said substrate assembly after said step of removing;
removing debris or residue from the surface of said substrate assembly after said step of cleaning and drying;
polishing minor scratches on the surface of said substrate assembly after said step of cleaning and drying; and
measuring said third thickness after said step of removing.

43. A substrate fabricated according to the method of claim 1.

44. The substrate according to claim 43, wherein a thickness of said substrate is less than 0.7 mm.

45. The substrate according to claim 43, wherein said substrate is a transparent substrate for a liquid crystal display device.

46. A substrate assembly for a liquid crystal display device fabricated according to the method of claim 12.

47. The substrate assembly according to claim 46, wherein the thickness of said substrate assembly is less than 1.4 mm.

48. The substrate assembly according to claim 46, further comprising a liquid crystal layer between said first and second substrates.

49. A substrate assembly for a liquid crystal display device fabricated according to the method of claim 30.

50. The substrate assembly according to claim 49, wherein the thickness of said substrate assembly is less than 1.4 mm.

51. The substrate assembly according to claim 49, further comprising a liquid crystal layer between said first and second substrates.

* * * * *